United States Patent
Zhang et al.

(10) Patent No.: US 9,563,939 B2
(45) Date of Patent: Feb. 7, 2017

(54) DE-NOISING SYSTEM FOR REMOTE IMAGES OF GROUND BUILDINGS USING SPECTRUM CONSTRAINTS AND DE-NOISING METHOD THEREOF

(71) Applicant: Huazhong University of Science and Technology, Wuhan (CN)

(72) Inventors: Tianxu Zhang, Wuhan (CN); Zheng Wang, Wuhan (CN); Li He, Wuhan (CN); Li Liu, Wuhan (CN); Xuan Hou, Wuhan (CN); Chuan Zhang, Wuhan (CN); Sufei Fan, Wuhan (CN); Yimeng Chen, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 14/964,559

(22) Filed: Dec. 9, 2015

(65) Prior Publication Data
US 2016/0189349 A1    Jun. 30, 2016

Related U.S. Application Data

(63) Continuation-in-part of application No. PCT/CN2015/072683, filed on Feb. 10, 2015.

(30) Foreign Application Priority Data

Dec. 30, 2014    (CN) .......................... 2014 1 0844639

(51) Int. Cl.
G06T 5/00    (2006.01)
G06T 7/00    (2006.01)
G06T 5/10    (2006.01)

(52) U.S. Cl.
CPC ................. *G06T 5/002* (2013.01); *G06T 5/10* (2013.01); *G06T 7/0081* (2013.01);
(Continued)

(58) Field of Classification Search
None
See application file for complete search history.

(56) References Cited

U.S. PATENT DOCUMENTS 6,731,824 B2 * 5/2004 Russell .................... G06K 9/00
382/145
7,483,569 B2 * 1/2009 Bhagavatula .......... G06K 9/746
382/181

OTHER PUBLICATIONS

WayBackMachine Archive of: "ImageMagick v6 Examples—Fourier Transforms", Nov. 6, 2012, pp. 1-24.*
(Continued)

*Primary Examiner* — Bernard Krasnic
(74) *Attorney, Agent, or Firm* — Matthias Scholl, PC; Matthias Scholl

(57) ABSTRACT

A de-noising method for remote images of ground buildings using spectrum constraints. The method includes: 1) obtaining a reference image of ground buildings from a remote image database of the ground buildings, performing a Fourier transformation on the reference image to obtain an amplitude spectrum, and performing a threshold segmentation, an erosion operation and a dilation operation successively on the amplitude spectrum to obtain a binary template of spectrum of the ground buildings; and 2) obtaining a real-time image of the ground buildings by a high-speed aircraft, performing a Fourier transformation on the real-time image to obtain a spectrum, filtering the spectrum of the real-time image in frequency domain by the binary template of spectrum of the ground buildings, and performing an inverse Fourier transformation thereon to generate a filtered real-time image of the ground buildings.

7 Claims, 9 Drawing Sheets

(52) U.S. Cl.
 CPC .. *G06T 7/0091* (2013.01); *G06T 2207/20056* (2013.01); *G06T 2207/20148* (2013.01); *G06T 2207/30184* (2013.01)

(56) References Cited

OTHER PUBLICATIONS

WayBackMachine Archive of: "Fred's ImageMagick Scripts", Jan. 6, 2012, pp. 1-17.*

* cited by examiner

DE-NOISING SYSTEM FOR REMOTE IMAGES OF GROUND BUILDINGS USING SPECTRUM CONSTRAINTS AND DE-NOISING METHOD THEREOF

CROSS-REFERENCE TO RELATED APPLICATIONS

This application is a continuation-in-part of International Patent Application No. PCT/CN2015/072683 with an international filing date of Feb. 10, 2015, designating the United States, and further claims priority benefits to Chinese Patent Application No. 201410844639.8 filed Dec. 30, 2014. The contents of all of the aforementioned applications, including any intervening amendments thereto, are incorporated herein by reference.

BACKGROUND OF THE INVENTION

Field of the Invention

The invention relates to a de-noising system for remote images of ground buildings using spectrum constraints and a de-noising method thereof applicable for image preprocessing in remote sensing, detection, navigation and guidance of a high-speed aircraft.

Background of the Invention

Remote sensing, detection, navigation and guidance of a high-speed aircraft are adversely affected by strong sensor noise caused by high frame rate and short integration duration of imaging.

Conventional de-noising methods by filtering are effective for weak noise but are usually ineffective for strong sensor noise caused by short integration duration of imaging.

In addition, conventional filtering methods often cause loss of imaging details and largely blur the image, which makes subsequent processing more difficult. More importantly, the methods are time consuming and weak in real-time performance, and fail to adapt to high frame rate of movable imaging systems.

SUMMARY OF THE INVENTION

In view of the above-mentioned problems, it is an objective of the invention to provide a de-noising system for remote images of ground buildings using spectrum constraints and a de-noising method thereof applicable for de-noising real-time images of ground buildings captured by a high-speed aircraft in remote sensing, detection, navigation and guidance so as to solve the problem of ineffective de-noising of strong noise and image blurring caused by lost image details.

To achieve the above objective, according to one embodiment of the present invention, there is provided a de-noising method for remote images of ground buildings using spectrum constraints, the method comprising:

(1) obtaining a reference image of target ground buildings from a remote image database of ground buildings, performing a Fourier transformation on the reference image to obtain an amplitude spectrum, and performing a threshold segmentation, an erosion operation and a dilation operation successively on the amplitude spectrum to obtain a binary template of spectrum of the target ground buildings; and (2) obtaining a real-time image of the target ground buildings by a high-speed aircraft, performing a Fourier transformation on the real-time image to obtain a spectrum, filtering the spectrum of the real-time image in frequency domain by the binary template of spectrum of the target ground buildings, and performing an inverse Fourier transformation thereon to generate a filtered real-time image of the target ground buildings.

In a class of this embodiment, step (1) further comprises:

(1.1) obtaining a reference image p of target ground buildings from a remote image database of ground buildings, and performing a two-dimensional fast Fourier transformation and a centralizing operation successively on the reference image p to obtain a centralized spectrum P thereof;

(1.2) calculating an amplitude spectrum $\overline{P}$ according to the centralized spectrum P of the reference image p where $\overline{P}$ is a modulus of the centralized spectrum P and $\overline{P}=|P|$;

(1.3) generating a histogram distribution $Hist_p(x)$ of the amplitude spectrum $\overline{P}$, and normalizing the histogram distribution $Hist_p(x)$ to obtain a normalized histogram distribution $$Hist'_p(x) = \frac{Hist_p(x)}{\sum_x Hist_p(x)},$$

where an abscissa x is amplitude of the amplitude spectrum $\overline{P}$;

(1.4) calculating a segmentation threshold T according to the normalized histogram distribution $Hist_p'(x)$, where $$\sum_{i=0}^{T} Hist'_p(x) = 1 - \gamma$$

and γ is a reserved quantity of a target spectrum template;

(1.5) performing a threshold segmentation on the amplitude spectrum $\overline{P}$ according to the segmentation threshold T to obtain a binary segmentation result $BW_0$; and (1.6) performing an erosion operation and a dilation operation successively on the binary segmentation result $BW_0$ to obtain a binary template BW of spectrum of the target ground buildings.

In a class of this embodiment, step (1.2) further comprises: calculating each point of the amplitude spectrum $\overline{P}$ by an equation $\overline{P(u,v)}=|P(u,v)|=\sqrt{(a^2+b^2)}$ to obtain the amplitude spectrum $\overline{P}$, where P(u,v) is a point of the centralized spectrum P with a complex form of P(u,v)=a+bi, (u,v) is a coordinate of P(u,v), $1 \leq u \leq 256$, $1 \leq v \leq 256$, and a and b are constants.

In a class of this embodiment, step (1.5) further comprises: determining $BW_0(u,v)=1$ if $\overline{P(u,v)} \geq T$, otherwise $BW_0(u,v)=0$, where $\overline{P(u,v)}$ is a point of the amplitude spectrum $\overline{P}$ and $BW_0(u,v)$ is a corresponding point of the binary segmentation result $BW_0$.

In a class of this embodiment, step (2) further comprises:

(2.1) obtaining a real-time image f of the target ground buildings by a high-speed aircraft, and performing a two-dimensional fast Fourier transformation and a centralizing operation successively thereon to obtain a centralized spectrum F of the real-time image f;

(2.2) generating a filter function H by the binary template BW of spectrum of the target ground buildings generated in step (1.6);

(2.3) performing a dot product operation on each element of the centralized spectrum F and a corresponding element of the filter function H to obtain a filtered spectrum G of the real-time image f thereby filtering the real-time image f in frequency domain where G=F*H; and (2.4) performing a two-dimensional inverse fast Fourier transformation on the filtered spectrum G of the real-time image f and performing a modulus operation on a result thereof to obtain a denoised real-time image g.

In a class of this embodiment, step (2.2) further comprises: generating a filter function H:

$$H(u', v') = \begin{cases} 1, & BW(u, v) = 1 \\ \lambda\%, & BW(u, v) = 0 \end{cases},$$

where BW(u,v) is a point of BW, H(u',v') is a point of the filter function H, (u',v') is a coordinate of H(u',v'), (u',v')=(u,v), 1≤u'≤256, 1≤v'≤256 and λ % is a reservation ratio of a filtered spectrum.

In a class of this embodiment, step (2.3) further comprises: calculating each point of the filtered spectrum G of the real-time image f by an equation G(u',v')=F(u',v')·H(u',v') to obtain the filtered spectrum G of the real-time image f, where F(u',v') is a point of the centralized spectrum F and H(u',v') is a corresponding point of the filter function H.

According to another embodiment of the present invention, there is provided a de-noising system for remote images of ground buildings using spectrum constraints, the system comprising:

a first module, operable for obtaining a reference image of target ground buildings from a remote image database of ground buildings, performing a Fourier transformation on the reference image to obtain an amplitude spectrum, and performing a threshold segmentation, an erosion operation and a dilation operation successively on the amplitude spectrum to obtain a binary template of spectrum of the target ground buildings; and a second module, operable for obtaining a real-time image of the target ground buildings by a high-speed aircraft, performing a Fourier transformation on the real-time image to obtain a spectrum, filtering the spectrum of the real-time image in frequency domain by the binary template of spectrum of the target ground buildings, and performing an inverse Fourier transformation thereon to generate a filtered real-time image of the target ground buildings.

Advantages of the method and system of the invention are summarized as follows:

1. High de-noising effect: since components not belonging to a target spectrum are filtered as possible by targeted filtering in frequency domain using spectrum constraints of target ground buildings, the invention can facilitate de-noising effectively and peak signal to noise ratio (PSNR) of a denoised image is improved significantly. According to experiments, PSNR of a real-time image of target ground buildings can be improved by more than 8 db by the de-noising method of the invention.

2. High edge and detail reservation: since high frequency or medium frequency components corresponding to edge and detailed information of an image are reserved as possible using spectrum constraints of target ground buildings, edge and detailed information of the image is highly reserved after filtering and image blurring caused by de-noising is slight.

3. Excellent real-time performance: since a real-time de-noising process of the invention is simple by performing only a two-dimensional fast Fourier transformation and an inverse Fourier transformation according to prior knowledge, it can achieve a comparatively high real-time performance not only by software, but also by hardware.

DETAILED DESCRIPTION OF THE EMBODIMENTS

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Ground buildings are regarded as an important kind of target in remote sensing, detection, navigation and guidance of a high-speed aircraft. Fundamental structures and components of ground buildings feature unique directionality in space, therefore as the buildings form a building group, the building group features unique directionality in frequency domain. An amplitude spectrum of Gaussian noise is approximately uniform in space and features no directionality after a Fourier transformation. The invention eliminates noise and reserves edge and detail information as possible by targeted filtering in frequency domain using spectrum constraints of target ground buildings in terms of differences between spatial frequency of the target ground buildings and that of Gaussian noise, so as to pave the way for subsequent image processing and target recognition.

Figure 1:
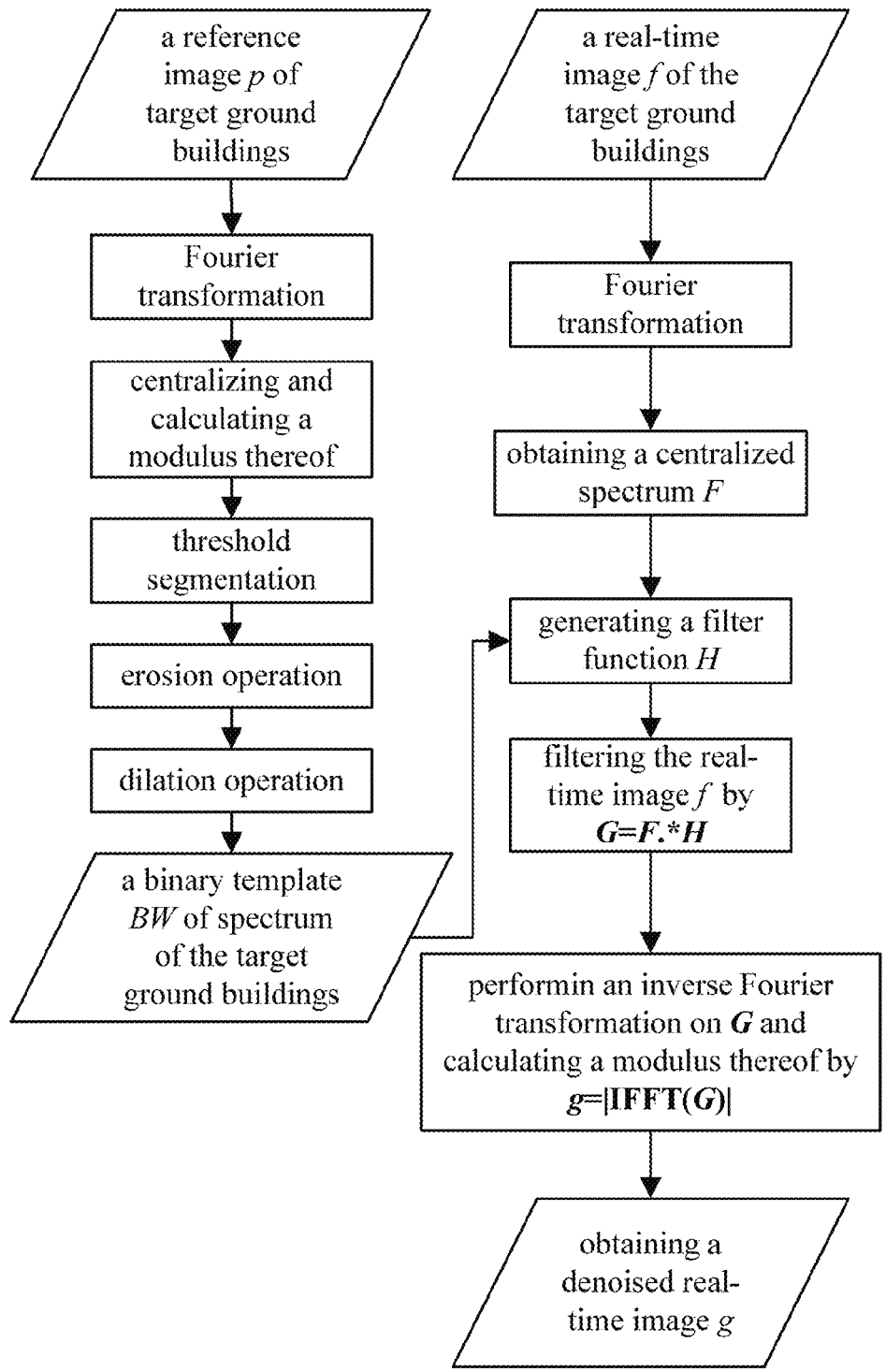
FIG. 1 is a flow chart of a de-noising method for remote images of ground buildings using spectrum constraints in accordance with one embodiment of the invention.

As in FIG. 1, the de-noising method for remote images of ground buildings using spectrum constraints comprises:

(1) Obtaining a reference image of target ground buildings from a remote image database of ground buildings, performing a Fourier transformation on the reference image to obtain an amplitude spectrum, and performing threshold segmentation, an erosion operation and a dilation operation successively on the amplitude spectrum to obtain a binary template of spectrum of the target ground buildings.

Specifically, the step further comprises the following sub-steps of:

(1.1) Obtaining a reference image p (in this embodiment, it is a grayscale image of 256×256) of target ground buildings from a remote image database of ground buildings, and performing a two-dimensional fast Fourier transformation (FFT) and a centralizing operation successively on the reference image p to obtain a centralized spectrum P thereof.

Figure 2:
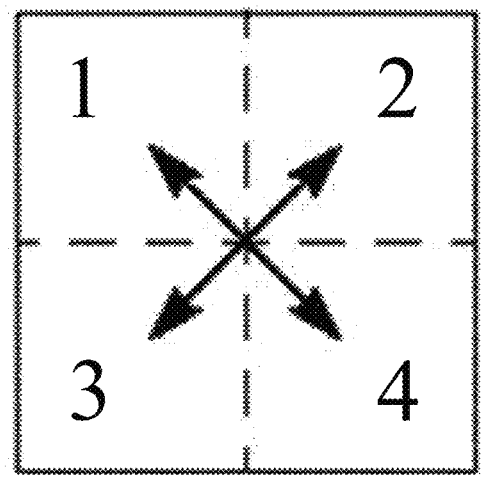
FIG. 2 is a diagram showing a centralizing operation on a spectrum in accordance with one embodiment of the invention.
Figure 3:
FIG. 3 is a reference image of target ground buildings obtained from a remote image database of ground buildings in accordance with one embodiment of the invention.

Specifically, a reference image p of target ground buildings is shown in FIG. 3. A two-dimensional fast Fourier transformation is performed on the reference image p to obtain a non-centralized spectrum $P_0$ of the reference image p. As shown in FIG. 2, the non-centralized spectrum $P_0$ is divided into 2×2 sub-blocks, a first sub-block and a third sub-block are exchanged and a second sub-block and a fourth sub-block are exchanged, thereby facilitating centralization of the spectrum and obtaining the centralized spectrum P, the center of which is low-frequency surrounded by high-frequency.

(1.2) Calculating an amplitude spectrum $\overline{P}$ according to the centralized spectrum P of the reference image p where $\overline{P}$ is a modulus of the centralized spectrum P and $\overline{P}=|P|$.

Figure 4A:
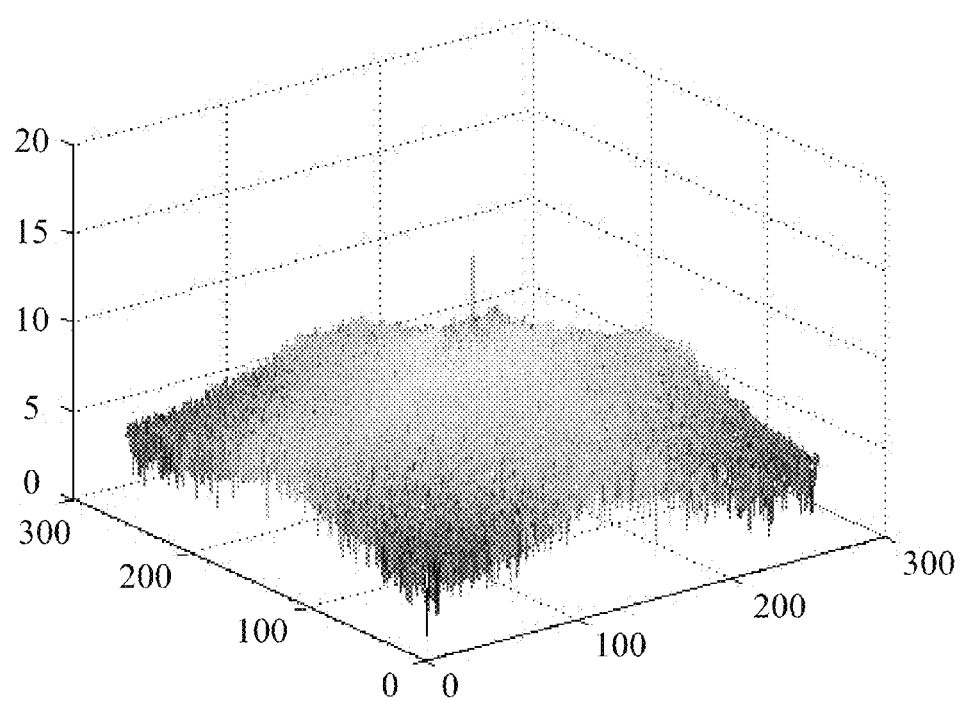
FIG. 4A is a centralized amplitude spectrum of the reference image of the target ground buildings in accordance with one embodiment of the invention.
Figure 4B:
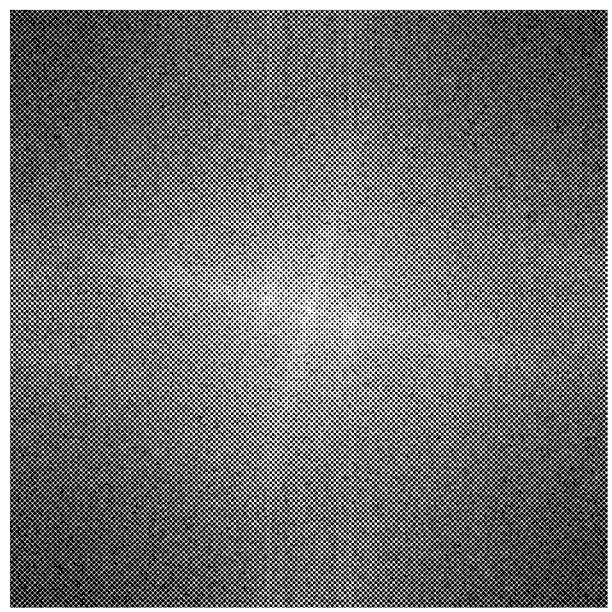
FIG. 4B is a gray scale image of the centralized amplitude spectrum of the reference image of the target ground buildings in accordance with one embodiment of the invention.

Specifically, each point of the amplitude spectrum $\overline{P}$ is calculated by an equation $\overline{P(u,v)}=|P(u,v)|=\sqrt{(a^2+b^2)}$ to obtain the amplitude spectrum $\overline{P}$, where P(u,v) is a point of the centralized spectrum P with a complex form of P(u,v)=a+bi, (u,v) is a coordinate of P(u,v), 1≤u≤256, 1≤v≤256, and a and b are constants. A three-dimensional image of the centralized amplitude spectrum $\overline{P}$ is shown in FIG. 4A, and a gray scale image of the centralized amplitude spectrum $\overline{P}$ is shown in FIG. 4B.

(1.3) Generating a histogram distribution $Hist_p(x)$ of the amplitude spectrum $\overline{P}$, and normalizing the histogram distribution $Hist_p(x)$ to obtain a normalized histogram distribution $$Hist'_p(x) = \frac{Hist_p(x)}{\sum_x Hist_p(x)},$$

where an abscissa x is amplitude of the amplitude spectrum $\overline{P}$.

Specifically, round down the amplitude spectrum $\overline{P}$ and generate the histogram distribution $Hist_p(x)$ at first, and then normalize the histogram distribution $Hist_p(x)$, namely $$Hist'_p(x) = \frac{Hist_p(x)}{\sum_x Hist_p(x)},$$

so as to obtain the normalized histogram distribution $Hist_p'(x)$.

(1.4) Calculating a segmentation threshold T according to the normalized histogram distribution $Hist_p'(x)$, where $$\sum_{i=0}^{T} Hist'_p(x) = 1 - \gamma$$

and γ is a reserved quantity of a target spectrum template in a range of 0-1;

In this embodiment, the reserved quantity γ of the target spectrum template is set to 0.2. Normally, a value of γ is set according to an actual situation insuring γ∈[0,1], and the greater γ is, the larger the target spectrum template is.

(1.5) Performing a threshold segmentation on the amplitude spectrum $\overline{P}$ according to the segmentation threshold T to obtain a binary segmentation result $BW_0$.

Figure 5A:
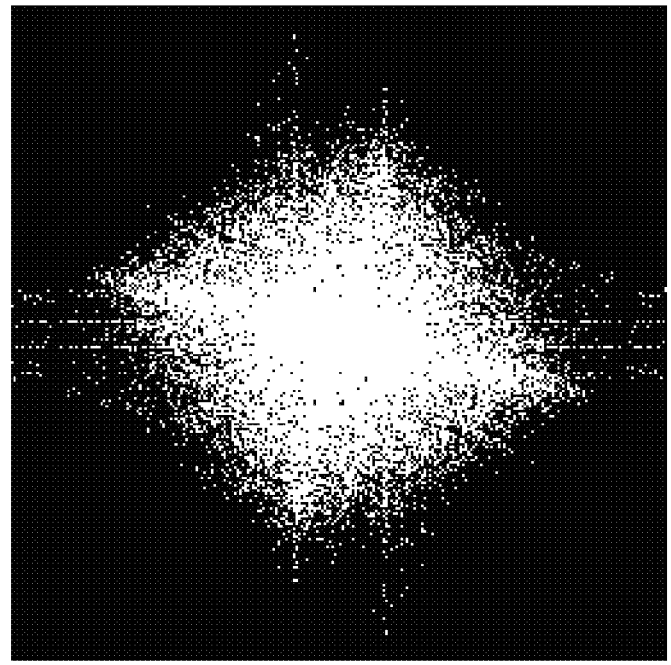
FIG. 5A is a binary segmentation result in accordance with one embodiment of the invention.

Specifically, determine $BW_0$ (u,v)=1 if $\overline{P(u,v)}$≥T, otherwise $BW_0$(u,v)=0, where $\overline{P(u,v)}$ is a point of the amplitude spectrum $\overline{P}$ and $BW_0$(u,v) is a corresponding point of the binary segmentation result $BW_0$, which is shown in FIG. 5A.

(1.6) Performing an erosion operation and a dilation operation successively on the binary segmentation result $BW_0$ to obtain a binary template BW of spectrum of the target ground buildings.

Figure 5B:
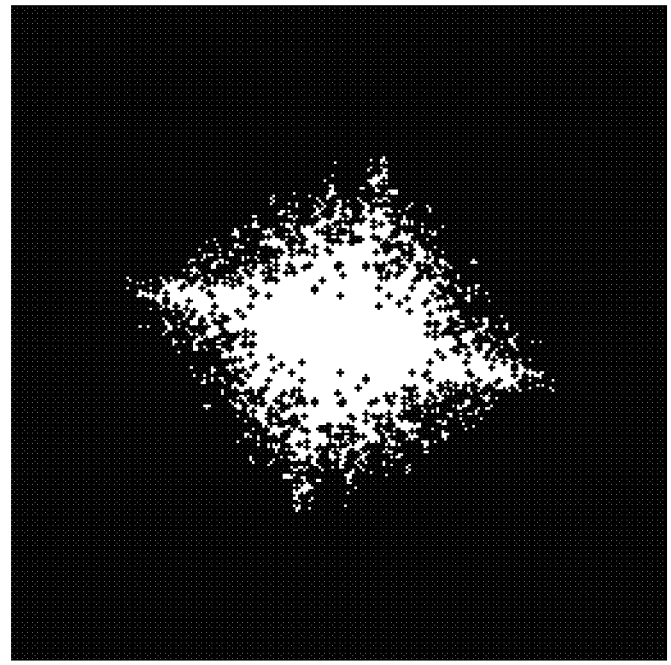
FIG. 5B is a binary segmentation result after an erosion operation in accordance with one embodiment of the invention.

Specifically, perform an erosion operation on the binary segmentation result $BW_0$ to obtain a binary segmentation result $BW_1$ in FIG. 5B. The erosion template is selected according to an actual situation. A circular template with a radius of 1 is selected in this embodiment.

Figure 5C:
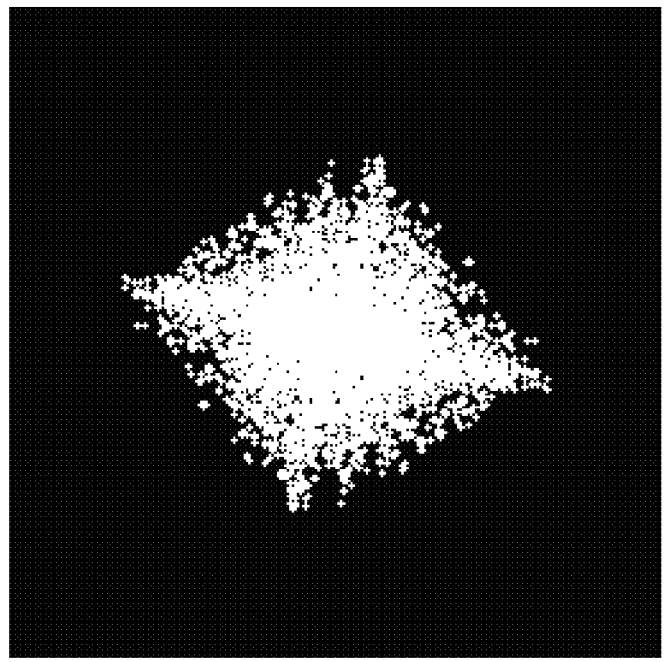
FIG. 5C is a binary template of spectrum of the target ground buildings in accordance with one embodiment of the invention.

Perform a dilation operation on the binary segmentation result $BW_1$ to obtain a binary template BW of spectrum of the target ground buildings in FIG. 5C. The dilation template is normally the same as the erosion template and can also be selected according to an actual situation.

(2) Obtaining a real-time image of the target ground buildings by a high-speed aircraft, performing a Fourier transformation on the real-time image to obtain a spectrum, filtering the spectrum of the real-time image in frequency domain by the binary template of spectrum of the target ground buildings, and performing an inverse Fourier transformation thereon to generate a filtered real-time image of the target ground buildings.

The step further comprises the following sub-steps of:

(2.1) Obtaining a real-time image f of the target ground buildings by a high-speed aircraft, and performing a two-dimensional fast Fourier transformation (FFT) and a centralizing operation successively thereon to obtain a centralized spectrum F of the real-time image f.

Figure 6:
FIG. 6 is a real-time image of the target ground buildings by a high-speed aircraft in accordance with one embodiment of the invention.
Figure 7A:
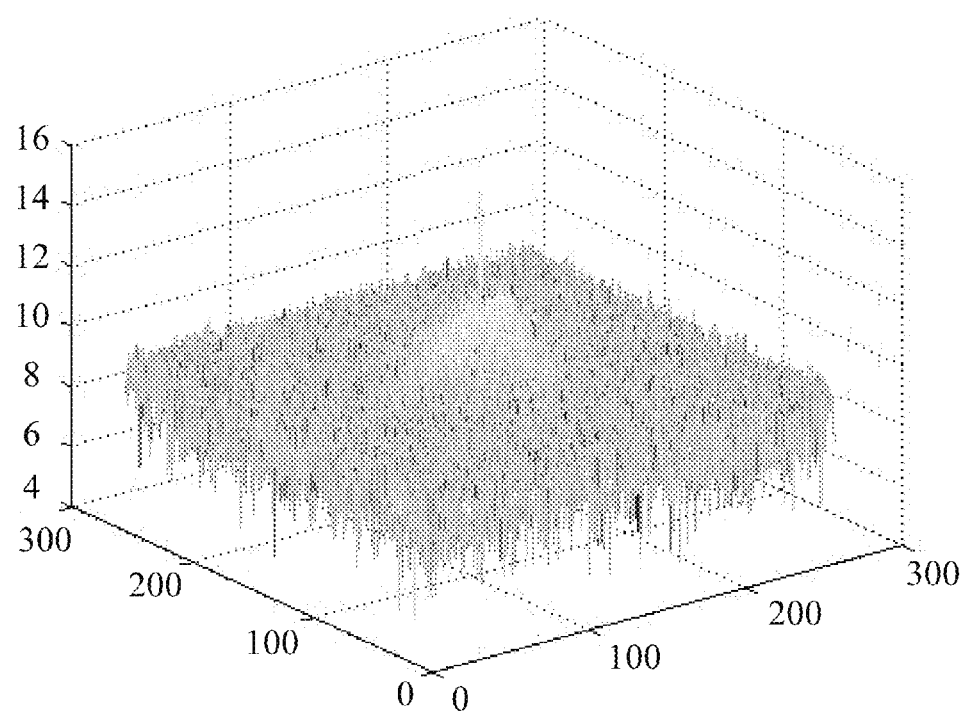
FIG. 7A is a centralized amplitude spectrum of the real-time image of the target ground buildings in accordance with one embodiment of the invention.
Figure 7B:
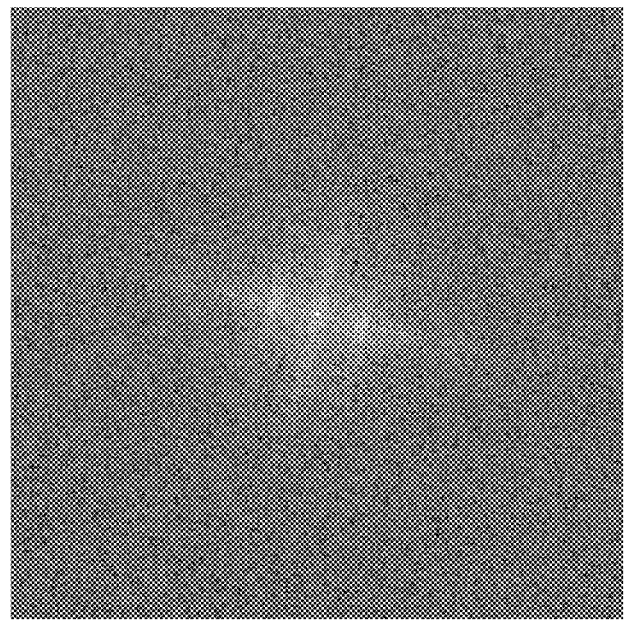
FIG. 7B is a gray scale image of the centralized amplitude spectrum of the real-time image of the target ground buildings in accordance with one embodiment of the invention.
Figure 8:
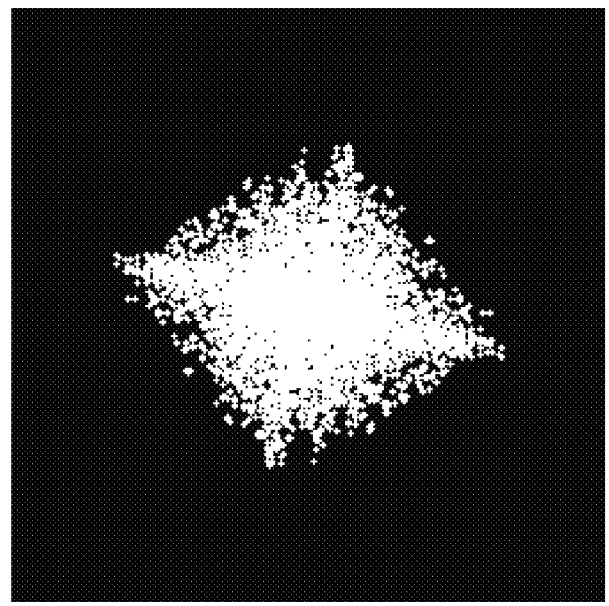
FIG. 8 is a binary template of a filter function H in accordance with one embodiment of the invention.

Specifically, a real-time image f (in this embodiment, it is a grayscale image of 256×256) of the target ground buildings obtained by a high-speed aircraft is shown in FIG. 6. A two-dimensional fast Fourier transformation and a centralizing operation of step (1.1) are performed successively on the real-time image f to obtain a centralized spectrum F of the real-time image f. FIG. 7A is a three-dimensional image of an amplitude spectrum of F and FIG. 7B is a gray scale image of the amplitude spectrum of F.

(2.2) Generating a filter function H by the binary template BW of spectrum of the target ground buildings generated in step (1.6).

Figure 9:
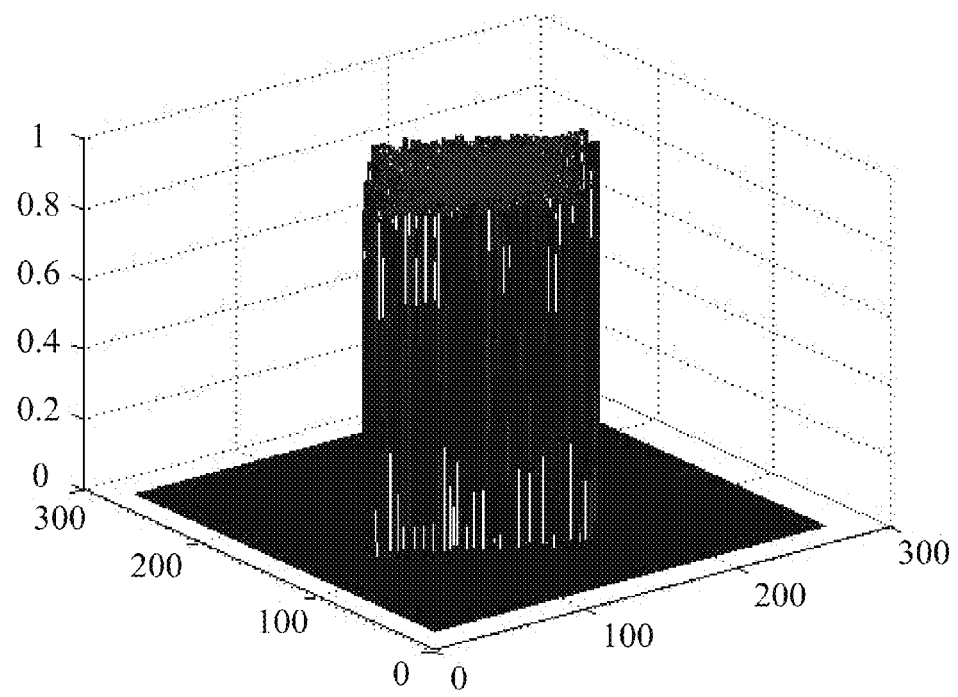
FIG. 9 is a three-dimensional image of the filter function H in accordance with one embodiment of the invention.

Specifically, a filter function H is generated firstly:

$$H(u', v') = \begin{cases} 1, & BW(u, v) = 1 \\ \lambda\%, & BW(u, v) = 0 \end{cases},$$

where BW (u,v) is a point of BW, H(u',v') is a point of the filter function H, (u',v') is a coordinate of H(u',v'), (u',v')= (u,v), 1≤u'≤256, 1≤v'≤256 and λ % is a reservation ratio of a filtered spectrum and is set according to an actual situation. Normally, λ∈[0,20] and in this embodiment, λ=5. A three-dimensional image of the filter function H is shown in FIG. 9.

(2.3) Performing a dot product operation on each element of the centralized spectrum F and a corresponding element of the filter function H to obtain a filtered spectrum G of the real-time image f thereby filtering the real-time image f in frequency domain where G=F*H.

Figure 10A:
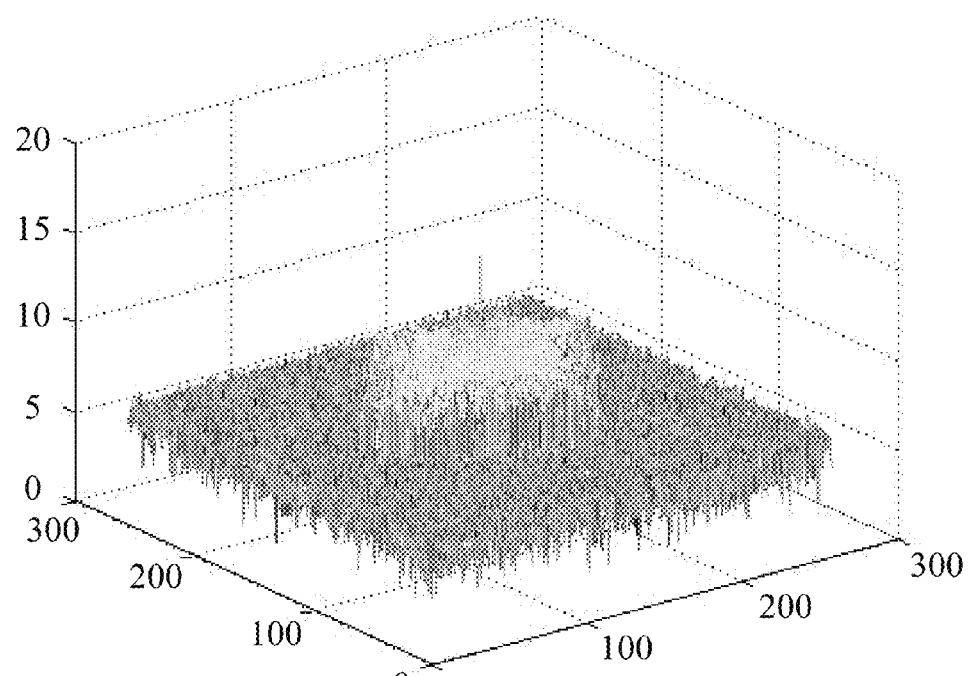
FIG. 10A is an amplitude spectrum of the real-time image after being filtered in frequency domain in accordance with one embodiment of the invention.
Figure 10B:
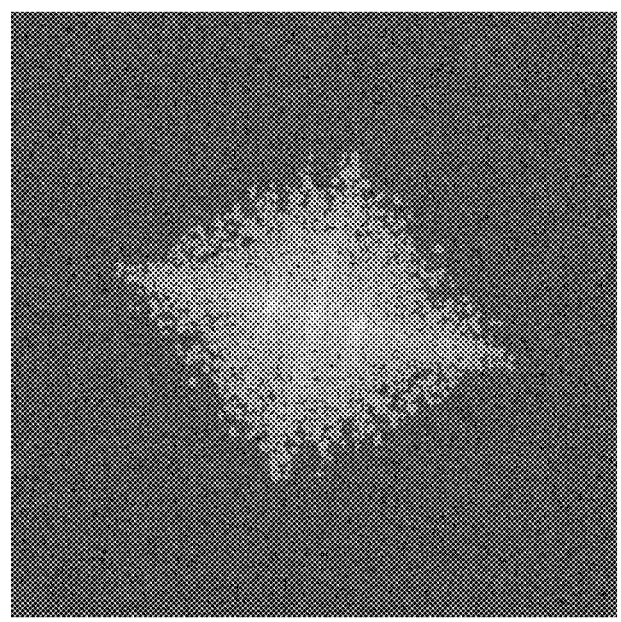
FIG. 10B is a gray scale image of the amplitude spectrum of the real-time image after being filtered in frequency domain in accordance with one embodiment of the invention.

Specifically, each point of the filtered spectrum G of the real-time image f is calculated by an equation G(u',v')=F(u', v')·H(u',v') to obtain the filtered spectrum G of the real-time image f, where F(u',v') is a point of the centralized spectrum F and H(u',v') is a corresponding point of the filter function H. FIG. 10A is a three-dimensional image of an amplitude spectrum of the filtered spectrum G of the real-time image f, and FIG. 10B is a rescale image of the amplitude spectrum of the filtered spectrum G of the real-time image f.

(2.4) Performing a two-dimensional inverse fast Fourier transformation (IFFT) on the filtered spectrum G of the real-time image f and performing a modulus operation on a result thereof to obtain a denoised real-time image g.

Figure 11:
FIG. 11 is a denoised real-time image of the target ground buildings in accordance with one embodiment of the invention.

Specifically, a two-dimensional inverse fast Fourier transformation is performed on the filtered spectrum G of the real-time image f, and a modulus operation is performed on the transforming result thereafter to obtain a denoised real-time image g=|IFFT(G)|, as shown in FIG. 11.

Performance Comparison:

Table 1 shows de-noising effect, edge and detail reservation and real-time performance of the de-noising method of the invention compared with those of Gaussian low-pass filtering, wavelet de-noising, singular value decomposition de-noising and non-local means de-noising in prior art.

TABLE 1

| De-noising method | The invention | Gaussian low-pass filtering | Wavelet de-noising | Singular value decomposition de-noising | Non-local means de-noising |
|---|---|---|---|---|---|
| PSNR/dB | 23.36 | 21.71 | 21.63 | 23.60 | 22.43 |
| SSIM | 0.9081 | 0.8836 | 0.8753 | 0.9028 | 0.8961 |
| Time consuming/s | 0.0905 | 0.0955 | 1.3937 | >80 | >3 |

It can be inferred from Table 1 that both peak signal to noise ratio (PSNR) of a denoised image of the invention and a structural similarity (SSIM) thereof compared with a reference image are significantly higher than Gaussian low-pass filtering, wavelet de-noising and non-local means de-noising, which means that both de-noising effect and edge and detail reservation of the invention are superior to the above three methods. Although peak signal to noise ratio of the denoised image of the invention is slightly lower than that of singular value decomposition de-noising, the structural similarity of the invention is higher, which means that edge and detail reservation of the invention is superior to singular value decomposition de-noising with comparatively slight image blurring. More importantly, time consuming of the invention is far smaller than that of singular value decomposition de-noising which can facilitate a real-time performance. On the whole, the invention is superior in de-noising effect, edge and detail reservation and real-time performance comprehensively.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A de-noising method for remote images of ground buildings using spectrum constraints, the method comprising:
   1) obtaining a reference image of target ground buildings from a remote image database of ground buildings, performing a Fourier transformation on the reference image to obtain an amplitude spectrum, and performing a threshold segmentation, an erosion operation and a dilation operation successively on the amplitude spectrum to obtain a binary template of spectrum of the target ground buildings; and
   2) obtaining a real-time image of the target ground buildings by a high-speed aircraft, performing a Fourier transformation on the real-time image to obtain a spectrum, filtering the spectrum of the real-time image in frequency domain by the binary template of spectrum of the target ground buildings to obtain a filtered spectrum, and performing an inverse Fourier transformation on the filtered spectrum to generate a denoised real-time image of the target ground buildings.

2. The method of claim 1, wherein step 1) further comprises:
   1.1) obtaining a reference image p of target ground buildings from a remote image database of ground buildings, and performing a two-dimensional fast Fourier transformation and a centralizing operation successively on the reference image p to obtain a centralized spectrum P thereof;
   1.2) calculating an amplitude spectrum $\overline{P}$ according to the centralized spectrum P of the reference image p where $\overline{P}$ is a modulus of the centralized spectrum P and $\overline{P}=|P|$;
   1.3) generating a histogram distribution $Hist_p(x)$ of the amplitude spectrum $\overline{P}$, and normalizing the histogram distribution $Hist_p(x)$ to obtain a normalized histogram distribution $$Hist'_p(x) = \frac{Hist_p(x)}{\sum_x Hist_p(x)},$$

where an abscissa x is the amplitude of the amplitude spectrum $\overline{P}$;

1.4) calculating a segmentation threshold T according to the normalized histogram distribution $Hist_p'(x)$, where $$\sum_{i=0}^{T} Hist_p'(x) = 1 - \gamma$$

and $\gamma$ is a reserved quantity of a target spectrum template;

1.5) performing a threshold segmentation on the amplitude spectrum $\overline{P}$ according to the segmentation threshold T to obtain a binary segmentation result $BW_0$; and 1.6) performing an erosion operation and a dilation operation successively on the binary segmentation result $BW_0$ to obtain a binary template BW of spectrum of the target ground buildings.

3. The method of claim 2, wherein step 1.2) further comprises:

calculating each point of the amplitude spectrum $\overline{P}$ by an equation $\overline{P(u,v)} = |P(u,v)| = \sqrt{(a^2+b^2)}$ to obtain the amplitude spectrum $\overline{P}$, where $P(u,v)$ is a point of the centralized spectrum P with a complex form of $P(u,v)=a+bi$, $(u,v)$ is a coordinate of $P(u,v)$, $1 \le u \le 256$, $1 \le v \le 256$, and a and b are constants.

4. The method of claim 3, wherein step 1.5) further comprises:

determining $BW_0(u,v)=1$ if $\overline{P(u,v)} \ge T$, otherwise $BW_0(u,v)=0$, where $\overline{P(u,v)}$ is a point of the amplitude spectrum $\overline{P}$ and $BW_0(u,v)$ is a corresponding point of the binary segmentation result $BW_0$.

5. The method of claim 4, wherein step 2) further comprises:

2.1) obtaining a real-time image f of the target ground buildings by a high-speed aircraft, and performing a two-dimensional fast Fourier transformation and a centralizing operation successively on the real-time image f to obtain a centralized spectrum F of the real-time image f;

2.2) generating a filter function H by the binary template BW of spectrum of the target ground buildings generated in step 1.6);

2.3) performing a dot product operation on each element of the centralized spectrum F and a corresponding element of the filter function H to obtain a filtered spectrum G of the real-time image f thereby filtering the real-time image f in frequency domain where G=F*H; and 2.4) performing a two-dimensional inverse fast Fourier transformation on the filtered spectrum G of the real-time image f and performing a modulus operation on a result thereof to obtain a denoised real-time image g.

6. The method of claim 5, wherein step 2.2) further comprises:

generating a filter function H:

$$H(u', v') = \begin{cases} 1, & BW(u, v) = 1 \\ \lambda\%, & BW(u, v) = 0 \end{cases},$$

where BW (u,v) is a point of BW, H(u',v') is a point of the filter function H, (u',v') is a coordinate of H(u',v'), (u',v')=(u,v), $1 \le u' \le 256$, $1 \le v' \le 256$ and $\lambda$ % is a reservation ratio of a filtered spectrum.

7. The method of claim 6, wherein step 2.3) further comprises:

calculating each point of the filtered spectrum G of the real-time image f by an equation $G(u',v')=F(u',v') \cdot H(u',v')$ to obtain the filtered spectrum G of the real-time image f, where F(u',v') is a point of the centralized spectrum F and H(u',v') is a corresponding point of the filter function H.

\* \* \* \* \*